(12) United States Patent
Branecky

(10) Patent No.: US 6,605,919 B1
(45) Date of Patent: Aug. 12, 2003

(54) METHOD AND APPARATUS FOR INDIRECTLY MEASURING INDUCTION MOTOR SLIP TO ESTABLISH SPEED CONTROL

(75) Inventor: Brian Thomas Branecky, Oconomowoc, WI (US)

(73) Assignee: A.O. Smith Corporation, Milwaukee, WI (US)

( * ) Notice: Subject to any disclaimer, the term of this patent is extended or adjusted under 35 U.S.C. 154(b) by 0 days.

(21) Appl. No.: 09/713,344

(22) Filed: Nov. 14, 2000

Related U.S. Application Data

(60) Provisional application No. 60/170,338, filed on Dec. 13, 1999.

(51) Int. Cl.$^7$ ................................................. H02P 5/34
(52) U.S. Cl. ...................... 318/729; 318/727; 318/432; 318/798; 318/799; 318/805; 318/812
(58) Field of Search ................................. 318/727, 432, 318/729, 798, 799, 805, 812

(56) References Cited

U.S. PATENT DOCUMENTS

| | | | | |
|---|---|---|---|---|
| 3,983,463 A | * | 9/1976 | Nabae et al. | 318/227 |
| 4,326,157 A | | 4/1982 | Herbert | 318/809 |
| 4,400,655 A | | 8/1983 | Curtiss et al. | 318/729 |
| 4,469,997 A | * | 9/1984 | Curtiss et al. | 318/729 |
| 4,482,852 A | * | 11/1984 | Muskovac | 318/729 |
| 4,677,360 A | | 6/1987 | Garces | 318/803 |
| 5,159,255 A | | 10/1992 | Weber | 318/775 |
| 5,206,574 A | | 4/1993 | Okamoto et al. | 318/800 |
| 5,272,428 A | * | 12/1993 | Spiegel et al. | 318/803 |
| 5,321,599 A | | 6/1994 | Tanamachi et al. | 363/41 |
| 5,334,923 A | * | 8/1994 | Lorenz et al. | 318/805 |
| 5,442,271 A | * | 8/1995 | Hatanaka et al. | 318/729 |
| 5,500,581 A | | 3/1996 | Hatanaka et al. | 318/727 |
| 5,521,482 A | | 5/1996 | Lang et al. | 318/800 |
| 5,731,682 A | | 3/1998 | Yamakawa | 318/805 |
| 5,754,026 A | * | 5/1998 | Hampo et al. | 318/802 |
| 5,828,199 A | * | 10/1998 | Tajima et al. | 318/779 |
| 5,861,728 A | * | 1/1999 | Tazawa et al. | 318/778 |
| 5,969,498 A | * | 10/1999 | Cooke | 318/799 |

FOREIGN PATENT DOCUMENTS

| | | |
|---|---|---|
| EP | 0330188 | 8/1989 |
| GB | 2244875 A | 12/1991 |
| GB | 2323984 A | 10/1998 |

OTHER PUBLICATIONS

Alberto Abbondanti & Michael B. Brennan, Variable Speed Induction Motor Drives Use Electronic Slip Calculator Based on Motor Voltages and Currents, IEEE Transactions on Industry Applications, Sep./Oct. 1975, vol. IA–11, No. 5, Pittsburg, PA.

* cited by examiner

Primary Examiner—Rita Leykin
(74) Attorney, Agent, or Firm—Michael Best & Friedrich LLP

(57) ABSTRACT

A method of establishing motor speed control, the method comprising the acts of generating a desired speed command, indirectly measuring the slip of the motor, and adjusting the speed command in response to the slip to maintain a constant speed.

21 Claims, 3 Drawing Sheets

METHOD AND APPARATUS FOR INDIRECTLY MEASURING INDUCTION MOTOR SLIP TO ESTABLISH SPEED CONTROL

RELATED APPLICATIONS

This application claims the benefit under 35 U.S.C. §119 of U.S. Provisional Application No. 60/170,338, entitled METHOD AND APPARATUS OF ESTIMATING ROTOR SPEED, filed on Dec. 13, 1999.

BACKGROUND

This invention relates to induction motors. More particularly, the invention relates to a method and apparatus for indirectly measuring induction motor slip and using the measurement to establish speed control.

As an AC induction motor rotates, the magnetic fields of the rotor and the stator interact. The stator windings are typically connected to a supply in three-phase form or single phase form. By applying a voltage across the windings, a radial, rotating magnetic field is formed. The rotor has solid aluminum bars cast in a "squirrel-cage" configuration. The rotating magnetic fields produced by the stator produce a current in the aluminum bars of the rotor. This produces a magnetic field in the aluminum bars which interacts with the rotating magnetic field of the stator to generate torque on the rotor. The rotor reacts to the magnetic field, but does not travel at the same speed. The rotor actually lags behind the speed of the rotating magnetic field. This lag is called slip, and is essentially a comparison of the speed of the rotor and the speed of the magnetic field. The slip typically increases proportionately with increases in load.

In some applications where a variable speed drive (i.e., controller) is being used with an induction motor, it is desirable to establish a constant operating speed for the motor. However, the speed of the motor has a tendency to change depending upon the load applied to the motor. Therefore, to attain a constant speed with a changing load, the drive requires information about the actual rotor speed. Stated differently, it is necessary to provide electronic feedback of the rotor speed to the drive. In the prior art, this feedback to the controller is typically measured with a tachometer which can be both expensive and unreliable. Other methods utilize a model of the motor, in combination with phase voltage and phase current and complex mathematical algorithms to indirectly measure rotor speed. A much more complex and expensive circuit or microprocessor is required to perform these calculations.

SUMMARY OF THE INVENTION

Accordingly, the invention provides a method and apparatus for indirectly measuring induction motor slip and using the measurement to provide actual speed information to the drive to establish constant speed control of the induction motor. In the apparatus of the invention, measured analog DC bus voltage and analog DC bus current are input to a power factor circuit which uses the DC bus voltage and current along with AC motor voltage and current to calculate a power factor. The power factor circuit is connected to a slip calculator circuit which uses desired motor speed and power factor to calculate slip. That is, since the desired speed of the motor is known, the measured power factor and speed can be used to calculate the slip, thereby providing an indirect measurement of induction motor slip. The slip calculator circuit is connected to a speed conversion circuit which converts the indirect measurement of induction motor slip to an actual motor speed value. This value is "fed-back" to the regulator to provide feedback control to the drive which constantly updates the commanded drive speed until the commanded speed and the actual speed (also referred to as "estimated speed" or "measured speed") are equal.

In the method of the invention, three phase AC power is supplied to energize the motor. A DC bus voltage and a DC bus current are measured. The measured DC bus voltage and current along with AC motor voltage and current are used to calculate the power factor for the commanded motor speed. The commanded motor speed and power factor are then used to calculate the motor slip at the given speed and power factor. Stated differently, the induction motor slip is indirectly measured based on the DC bus voltage and current. This technique is most effective for variable speed drives at higher speeds for two reasons. The first is that there are two slips for each power factor value, one at relatively low speeds and a second at relatively high speeds. The second is that, at different drive frequencies, the stator resistance becomes a larger percentage of the loss impedance of the motor thus changing the power factor to slip relationship. At higher speeds, the influence of the stator resistance on this relationship is nominal.

The slip is then used to calculate an actual motor speed value. This value is "fed-back" to the regulator to provide feedback control to the drive which constantly updates the commanded drive speed until the commanded speed and the actual speed (also referred to as "estimated speed" or "measured speed") are equal.

The principal advantage of the invention is to provide constant speed control of an induction motor by indirectly measuring the motor slip.

Another advantage of the invention is the use of measured bus voltage and bus current in addition to phase voltage and phase current to simplify the rotor speed calculation. The simpler calculation allows the use of a simpler and less expensive microprocessor circuit.

Other features and advantages of the invention will become apparent to those skilled in the art upon review of the following detailed description, claims and drawings.

Before one embodiment of the invention is explained in full detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENTS

Figure 1:
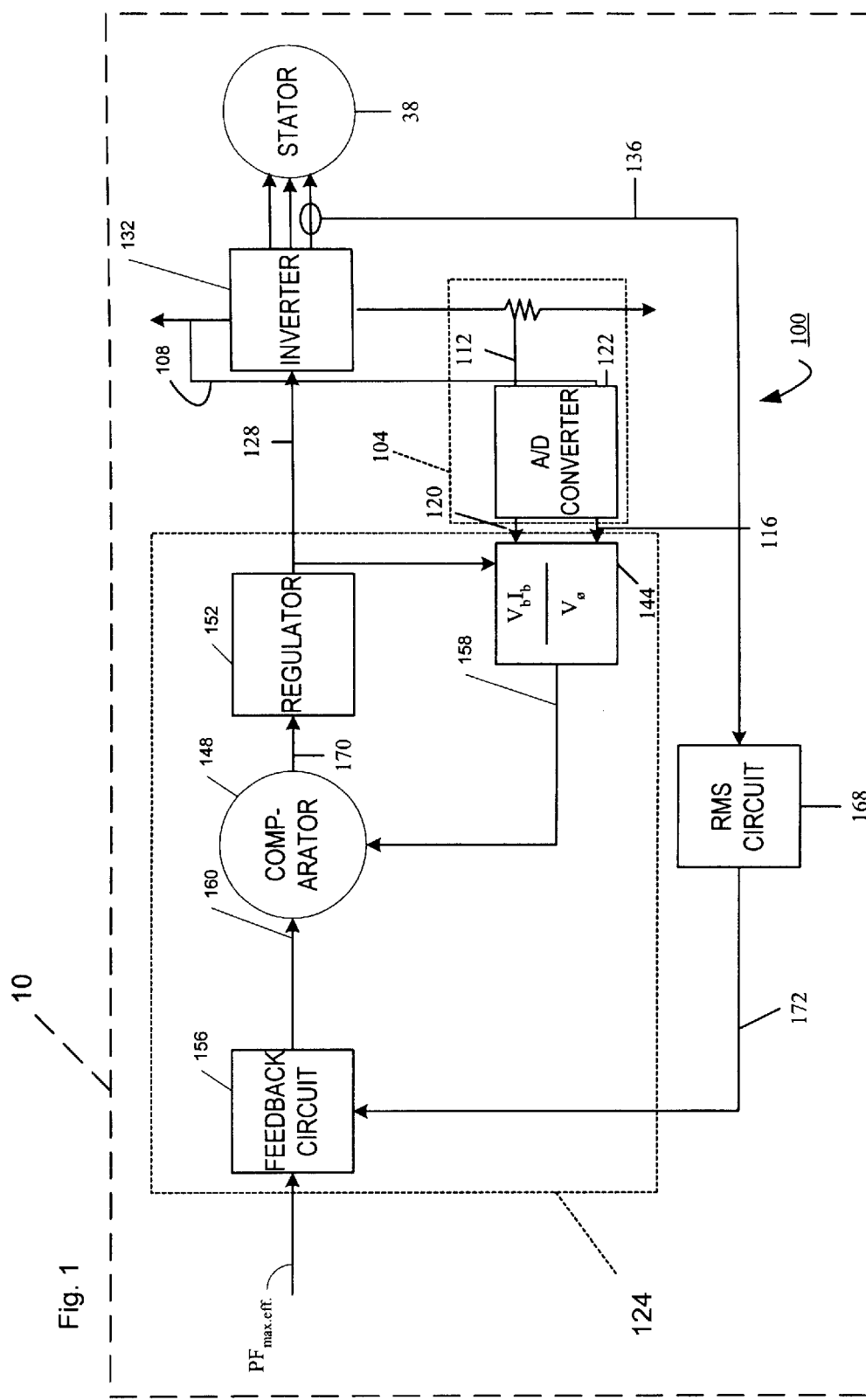
FIG. 1 is a schematic diagram of an induction motor including an efficiency optimization circuit for controlling the induction motor.

Shown in FIG. 1 of the drawings is a schematic view of an induction motor 10 embodying the invention. The details of the induction motor are commonly known in the art and form no part of the invention. Accordingly, the induction motor will not be described in detail. The motor 10 includes an efficiency optimization circuit 100 for controlling the excitation of the stator 38. The efficiency optimization circuit 100 includes a measuring circuit 104 for measuring a DC bus voltage 108 and DC bus current 112. The DC bus voltage and current are input to analog to digital (A/D) converter 122 which is electrically connected to a circuit 124. The circuit 124 may be a microprocessor or may be comprised of discrete components. In the embodiment of the invention including a microprocessor, the method of the invention is preferably implemented using a computer software program or programs stored in the memory for the microprocessor. The circuit 124 includes a torque producing current circuit component 144, a comparator circuit component 148, a regulator circuit component 152, and a feed back circuit component 156. The circuit 100 also includes an inverter 132, and an RMS conversion circuit 168 connected as shown.

In operation, the slip at which a motor operates with maximum efficiency ($S_{max.eff}$) is constant for a given induction motor. Thus, lowering the operating voltage $V_\phi$ until ($S_{max.eff}$) is attained is one way of operating the motor at maximum efficiency. When the motor is operating at any slip less than the rated slip, the efficiency optimization circuit 100 of the invention uses the relationship between the torque producing component $I_q$ and flux producing component $I_d$ of the current $I_\phi$ supplied to the motor.

The measuring circuit 104 measures a DC bus voltage 108 and a DC bus current 112. These voltages are preferably measured via a voltage and current bus. The DC bus voltage 108 and the DC bus current 112 are analog signals that are converted by an analog-to-digital ((A/D) converter 122 to a digital voltage signal 116 ($V_{dc}$) and a digital current signal 120 ($I_{dc}$).

The digital voltage signal 116 and the digital current signal 120 are supplied to the torque producing current circuit 144 along with an initial condition value of the phase voltage 128 ($V_\phi$). Assuming that the inverter 132 has no losses, the conservation of power equation in the inverter is:

$$P_{in} = V_{dc} \cdot I_{dc} = |V\phi| \cdot |I\phi| \cdot \cos(\theta) = P_{out};$$

where $\theta$ is the angle between the phase voltage $V_\phi$ and the phase current $I_\phi$. Solving for the power factor yields:

$$\cos(\theta) = \frac{V_{dc} I_{dc}}{|V_\phi| \cdot |I_\phi|}.$$

Assuming that $\theta$ and $\phi$ (the angle between the phase current and the torque producing current) are approximately equal, then the torque producing component of the current $I_q$ is approximately defined by the following equation:

$$I\phi \cos(\theta)$$

$$I_\phi \cos(\theta) = \frac{V_{dc} I_{dc}}{|V_\phi|}.$$

The torque producing current circuit 144 calculates the approximation of the torque producing component of the current 158 ($I_q$) as $I_\phi \cos \theta$, and inputs the current 158 to a comparator circuit 148. The comparator circuit 148 compares the current 158 with a desired torque producing current value 160. The desired torque producing value ($I_\phi \cos \theta_{cmd}$) 160 is determined by the feedback circuit 156. The phase current 136 ($I_\phi$) is measured using a sensor (not shown) at the motor coils. The phase current 136 ($I_\phi$) is input into the RMS circuit 168, where the AC phase current 136 ($I_\phi$) is converted to an RMS value 172 ($I_{\phi RMS}$) of phase current 136 ($I_\phi$). The RMS value 172 is input into the feedback circuit 156, along with the power factor for maximum efficiency $\cos \theta_{cmd}$, which is a known constant for the motor. The feedback circuit 156 determines the appropriate angle, based on motor parameters, between the phase voltage $V_\phi$ and the phase current $I_\phi$ for maximum efficiency. More specifically, the feedback circuit 156 calculates the cosine of the angle, thus factoring the change of angle from $I_\phi$ to $I_q$, resulting in the estimated torque producing current value $I_\phi \cos \theta_{cmd}$ 160.

Comparator circuit 148 compares the desired torque producing current value 160 ($I_\phi \cos \theta_{cmd}$) and the current 158 to generate an error term 170 representing the difference between the calculated and desired torque producing current. The error term 170 is supplied to the regulator circuit 152. If the calculated and desired torque producing current values are the same value, the error term 170 is zero.

The regulator 152 increments or decrements the commanded phase voltage 128 ($V_\phi$) by the error term 170, generating a new value for a commanded phase voltage value 128. If the calculated and desired torque producing current values are the same, the error term 170 is equal to zero, and accordingly, the commanded phase voltage does not change. The new commanded phase voltage is then input into the inverter 132, which converts the rectified DC power to three-phase AC power. The three-phase AC power is then fed to the terminals 38 of motor 10.

The new commanded phase voltage 128 ($V_\phi$) is also fed back from the regulator 152 and used as the next commanded phase voltage ($V_\phi$) for determining the actual torque producing current, and the cycle repeats. By constantly updating the commanded phase voltage $V_\phi$, the motor 10 is able to continually operate at the slip, thereby increasing the efficiency of the motor.

Figure 2:
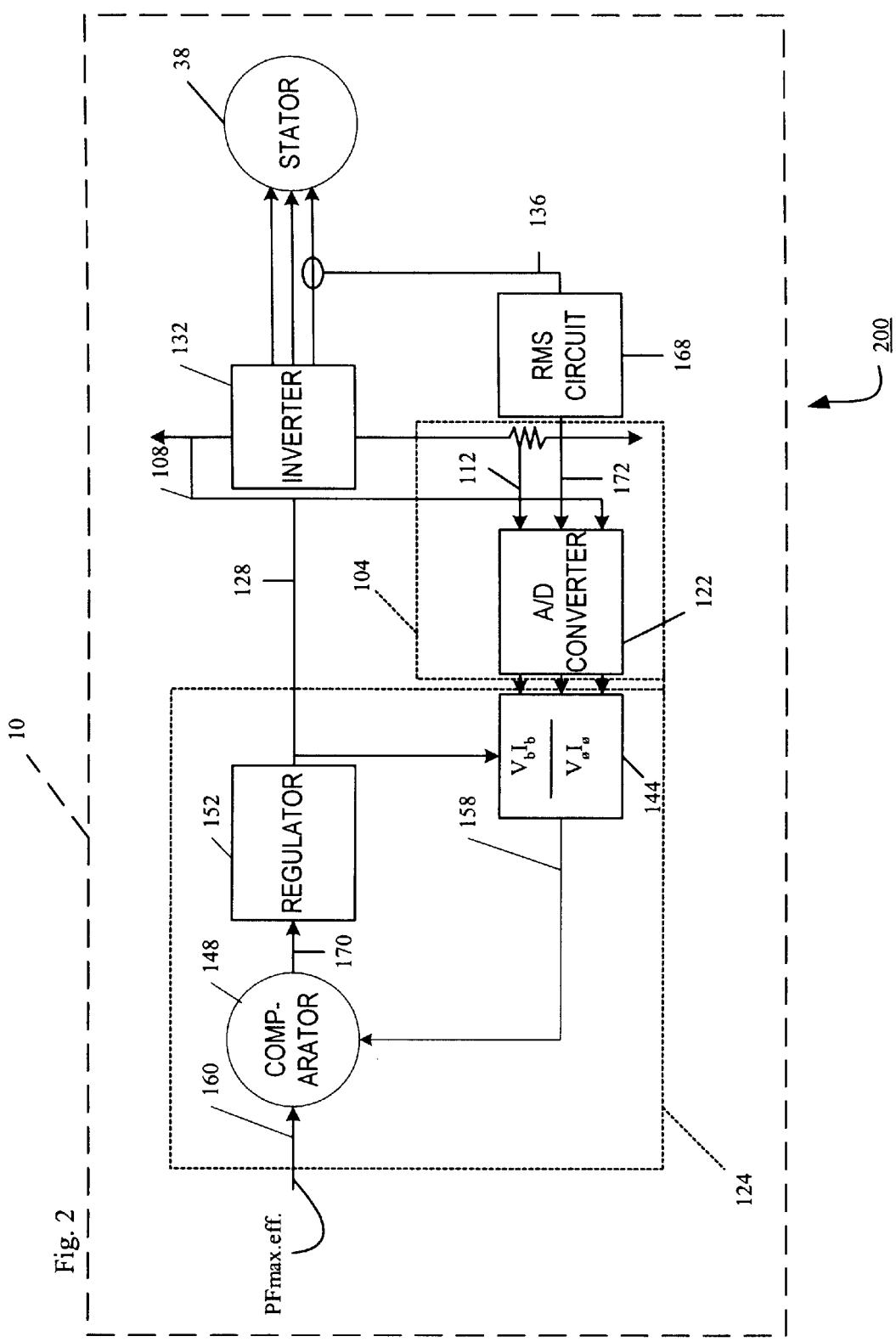
FIG. 2 is a schematic view of another embodiment of the efficiency optimization circuit of the induction motor.

FIG. 2 schematically illustrates another embodiment 200 of the efficiency optimization circuit of the induction motor. Like parts are identified using like reference numerals. As shown in FIG. 2, the input 160 to comparator circuit 148 is simply the desired power factor $\cos \theta_{cmd}$, and the input 158 to comparator circuit 148 from the torque producing current circuit 144 is a calculated power factor ($\cos \theta$), which is calculated similar to $I_\phi \cos \theta$, except that the additional division operation is performed using $I_\phi$. This is achieved by directly supplying the RMS phase current 172 ($I_{\phi RMS}$) to the torque producing current circuit 144 through A/D converter 122, instead of through a feedback loop as is shown in FIG. 1. The overall operation of the efficiency optimization circuit 200 is simpler than that of the efficiency optimization circuit 100, and thus requires less time to update the commanded phase voltage ($V_\phi$).

Figure 3:
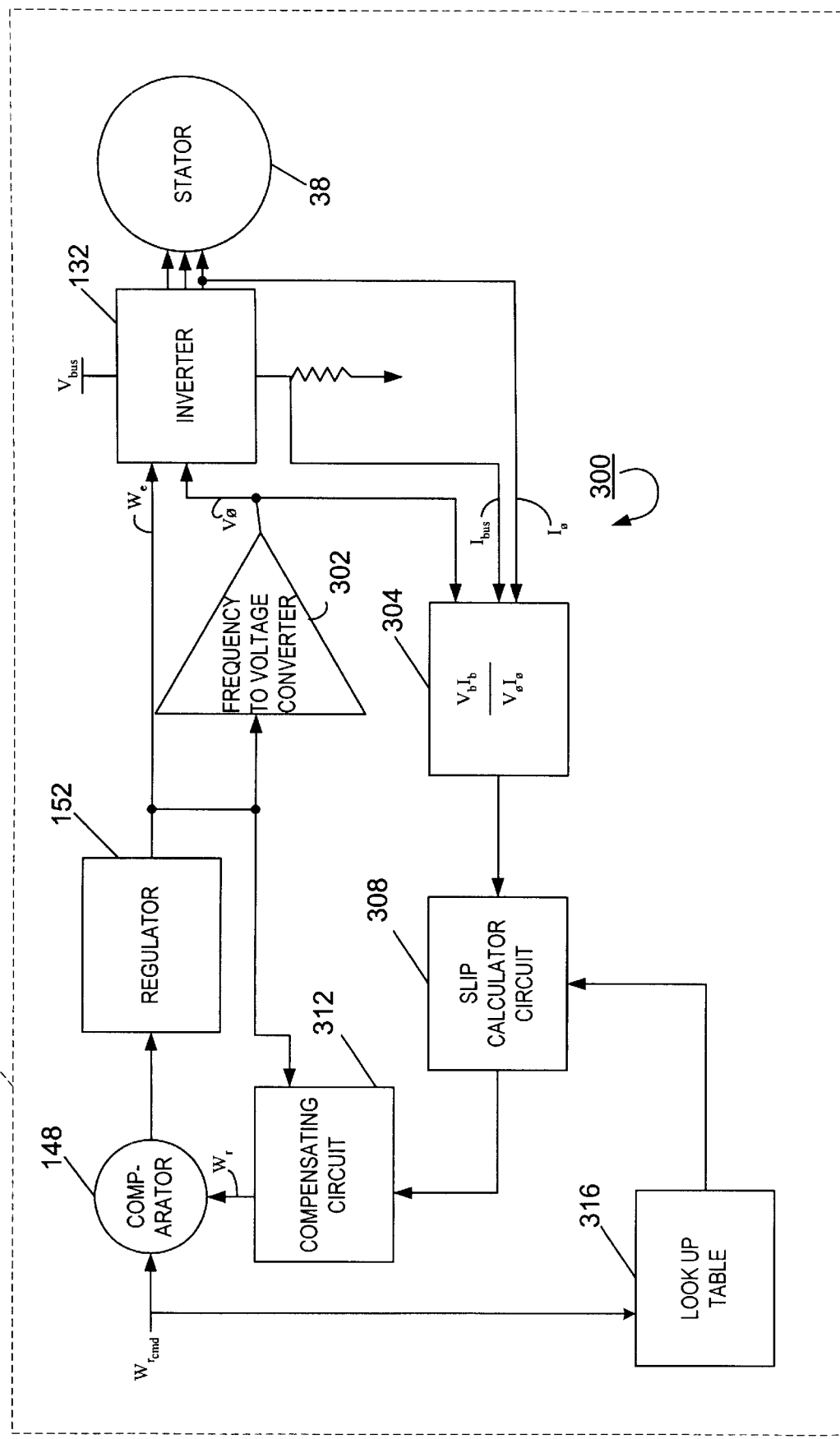
FIG. 3 is a schematic view of a constant speed drive for an induction motor embodying the invention.

FIG. 3 schematically illustrates another embodiment of the motor 10 having a control circuit 300 for effecting constant speed control through an indirect measurement of slip. Like parts are identified using like reference numerals. The desired speed command, ($W_{r_{cmd}}$) is input to a comparator circuit 148 which includes a feed back input for adjusting the desired speed command to achieve constant speed control of the induction motor. The output of the comparator circuit 148 is connected to a regulator 152 and from there to an inverter 132 to supply a three phase drive stimulus to the stator 38. The estimated speed command ($W_e$) output from the regulator 152 is also connected to a frequency to voltage converter 302 which outputs a phase voltage to the inverter 132. DC bus voltage and DC bus current as well as AC motor voltage and current are supplied to a power factor circuit 304 which calculates the power factor of the motor using the relationship $V_b I_b / V_0 I_0$=Power Factor (PF). The output (PF) of the power factor circuit 304 is connected to a slip calculator circuit 308. The slip calculator circuit 308 is connected to a power factor coefficient look up table 316. Using the desired speed command ($W_{r_{cmd}}$) as a reference, look up table 316 supplies to slip calculator circuit 308 a speed dependent power factor coefficient $K_n$. Slip calculator circuit 308 calculates the actual slip of the motor at the commanded speed using the relationship:

$$S = \sum_{n=o}^{m} K_n PF^n$$

The indirectly measured and calculated slip is input to a compensating circuit or speed conversion circuit 312 which, using the estimated speed command output from regulator 152, calculates a compensation factor ($W_r$) which is then input to comparator 148 to adjust the commanded speed input to the regulator 152. The compensation factor is calculated using the relationship:

$$W_r = (1-S) W_e$$

The control circuit 300 constantly updates the commanded drive speed until the commanded speed and the actual speed (also referred to as "estimated speed" or "measured speed") are equal.

What is claimed is:

1. A method of establishing motor speed control of a motor receiving power from an inverter, the method comprising the acts of:
   generating a desired speed command;
   supplying a bus voltage to the inverter;
   controlling the inverter to supply an alternating current (AC) motor voltage and an AC motor current to the motor, the controlling act resulting in a bus current;
   indirectly measuring the slip of the motor based on the bus voltage, bus current, AC motor voltage, and AC motor current; and
   adjusting the speed command in response to the slip to maintain a constant speed.

2. A method as set forth in claim 1 wherein the act of indirectly measuring the slip of the motor includes the act of calculating a power factor of the motor using the bus voltage, bus current, AC motor voltage and AC motor current.

3. A method as set forth in claim 2 wherein the act of indirectly measuring the slip of the motor further includes the act of calculating the slip based on the power factor.

4. A method as set forth in claim 3 wherein the act of indirectly measuring the slip of the motor further includes the act of generating a speed dependent constant for calculating the slip.

5. A method as set forth in claim 1 wherein the act of adjusting the speed command includes the act of calculating a speed error factor.

6. A method as set forth in claim 5 wherein the act of adjusting the speed command further includes the act of adjusting the desired speed command in response to the speed error factor to maintain a constant motor speed.

7. A method of establishing motor speed control of a motor powered by an inverter, the method comprising the acts of:
   generating a desired speed command;
   indirectly measuring the slip of the motor, the act of indirectly measuring the slip including the acts of determining an inverter bus voltage, an inverter bus current, a supplied motor voltage and a supplied motor current, calculating a power factor of the motor using the inverter bus voltage, inverter bus current, supplied motor voltage and supplied motor current, and calculating the slip based on the power factor; and
   adjusting the speed command in response to the slip to maintain a constant speed.

8. A method as set forth in claim 7 wherein the act of indirectly measuring the slip of the motor further includes the act of generating a speed dependent constant for calculating the slip.

9. A method as set forth in claim 7 wherein the act of adjusting the speed command includes the act of calculating a speed error factor.

10. A method as set forth in claim 7 wherein the act of adjusting the speed command includes the act of adjusting the desired speed command in response to the speed error factor to maintain a constant motor speed.

11. A software program, stored in a computer readable medium, for establishing constant motor speed control of a motor powered by an inverter, the software program performing the acts of:
    generating a desired speed command;
    indirectly measuring and calculating the slip of the motor based on a bus voltage and a bus current of the inverter and a voltage and a current supplied to the motor; and
    adjusting the speed command in response to the slip to maintain a constant motor speed.

12. A software program as set forth in claim 11 wherein the act of indirectly measuring the slip of the motor further includes the acts of calculating a power factor of the motor using the inverter bus voltage, inverter bus current, supplied motor voltage and supplied motor current, and calculating the slip based on the power factor.

13. A software program as set forth in claim 12 wherein the act of indirectly measuring the slip of the motor further includes the act of calculating the slip based on the power factor.

14. A software program as set forth in claim 13 wherein the act of indirectly measuring the slip of the motor further includes the act of generating a speed dependent constant for calculating the slip.

15. A software program as set forth in claim 11 wherein the act of adjusting the speed command includes the act of calculating a speed error factor.

16. A software program as set forth in claim 15 wherein the act of adjusting the speed command further includes the act of adjusting the desired speed command in response to the speed error factor to maintain a constant motor speed.

17. An induction motor comprising:
    a rotor;
    a stator; and
    a control circuit for driving the rotor at a predetermined speed relative to the stator, the control circuit including
    an inverter that receives a bus voltage and supplies a voltage and a current to the motor in response to a control signal, the control of the inverter resulting in a bus current;
    an estimating circuit to calculate a motor slip based on the bus voltage, bus current, supplied motor voltage, and supplied motor current; and
    a compensating circuit to adjust a motor speed based on the motor slip to allow constant speed control of the motor regardless of changes in motor load.

18. An induction motor as set forth in claim 17 wherein the estimating circuit includes a memory array storing an array of compensation factors for given speeds of the rotor.

19. An induction motor as set forth in claim 17 wherein the control circuit further includes a power factor circuit for calculating the power factor.

20. An induction motor as set forth in claim 19 wherein the power factor circuit calculates the power factor of the motor based on the bus voltage, bus current, supplied motor voltage, and supplied motor current.

21. An induction motor as set forth in claim 17 wherein the estimating and compensating circuits are microprocessor controlled.

* * * * *

UNITED STATES PATENT AND TRADEMARK OFFICE
CERTIFICATE OF CORRECTION

PATENT NO. : 6,605,919 B1
APPLICATION NO. : 09/713344
DATED : August 12, 2003
INVENTOR(S) : Brian Thomas Branecky It is certified that error appears in the above-identified patent and that said Letters Patent is hereby corrected as shown below:

IN THE DRAWINGS:

In Fig. 1, in box 144, change the equation:

$$\frac{V_b I_b}{V_\phi}$$

to $$\frac{V_{dc} I_{dc}}{|V_\phi|}$$

In Fig. 2, in box 144, change the equation:

$$\frac{V_b I_b}{V_\phi I_\phi}$$

to $$\frac{V_{dc} I_{dc}}{|V_\phi| \cdot |I_\phi|}$$

In Fig. 3, in box 144, change the equation:

$$\frac{V_b I_b}{V_\phi I_\phi}$$

to $$\frac{V_{dc} I_{dc}}{|V_\phi| \cdot |I_\phi|}$$

UNITED STATES PATENT AND TRADEMARK OFFICE
CERTIFICATE OF CORRECTION

PATENT NO.       : 6,605,919 B1
APPLICATION NO. : 09/713344
DATED            : August 12, 2003
INVENTOR(S)      : Brian Thomas Branecky It is certified that error appears in the above-identified patent and that said Letters Patent is hereby corrected as shown below:

In Fig. 3, add a direct link between $V_{bus}$ and box 304 and add reference nos. 108 and 112 as similarly shown in Figures 1 and 2.

Signed and Sealed this

Eleventh Day of July, 2006

JON W. DUDAS
*Director of the United States Patent and Trademark Office*